UNITED STATES PATENT OFFICE.

HARRY M. FERNBERGER, OF DOLLAR BAY, MICHIGAN, AND WILLIAM W. MURRAY, OF PHILADELPHIA, PENNSYLVANIA.

PROCESS OF DETINNING.

No. 913,275.      Specification of Letters Patent.      Patented Feb. 23, 1909.

Application filed January 17, 1906. Serial No. 296,569.

*To all whom it may concern:*

Be it known that we, HARRY M. FERNBERGER, of Dollar Bay, in the county of Houghton and State of Michigan, and WILLIAM W. MURRAY, of Philadelphia, in the county of Philadelphia and State of Pennsylvania, have invented a certain new and useful Process of Detinning, of which the following is a specification.

Our invention relates to a certain new and useful improvement in the process of detinning, and it particularly seeks to provide a process in which tin scrap, such as clippings from tin plate, tinned milk cans, old tin cans, and any other tin scrap, can be freed of their tin in a quick and efficient manner by use of a solvent that will dissolve the tin without attacking, to an appreciable extent, the iron and other like substances.

Our invention also has for its object to provide such a solvent as can be continuously reused, will be anhydrous, insoluble in water, a solvent for stannic chlorid ($SnCl_4$), a non-solvent for ferric chlorid ($FeCl_3$), a solvent for anhydrous chlorin (Cl) and which will be a solvent for greases, fats and the like, thus enabling the tin scrap to be dissolved without previous treatment with caustic to remove the fat and grease and clean the scrap.

In carrying out our improved process, we make use of an organic compound, such as carbon tetra chlorid ($CCl_4$) which has all the properties above referred to, namely, it is anhydrous insoluble in water ($H_2O$), a solvent for stannic chlorid ($SnCl_4$), dissolves chlorin gas ($Cl_2$), will not dissolve ferric chlorid ($FeCl_3$), but dissolves greases and fats, etc.

The manner in which our process is performed is as follows:—We place the scrap tin in a suitable retort or closed vessel, and cover the scrap with carbon tetra chlorid ($CCl_4$) after which anhydrous chlorin gas ($Cl_2$) is passed into the vessel until the carbon tetra chlorid has been saturated and the tin dissolved off the scrap, into a solvent ($CCl_4$) as a stannic chlorid ($SnCl_4$). Any iron chlorid ($FeCl_3$) which may possibly be formed during this step of our process, being insoluble in carbon tetra chlorid ($CCl_4$) and in stannic chlorid ($SnCl_4$) will remain undissolved. The solution of stannic chlorid in carbon tetra chlorid is then withdrawn from the iron residue, which consists of a little ferric chlorid and scrap iron. The iron residue may be washed with fresh solvent ($CCl_4$) or water and heated to recover the last traces of carbon tetra chlorid. The solution of stannic chlorid in carbon tetra chlorid is next filtered and then agitated or boiled with water with a return condenser. The stannic chlorid being soluble in water, will be dissolved thereby to form aqueous solution of stannic chlorid; the solvent ($CCl_4$) being insoluble in water, will not be affected thereby. If this mixture of solvent (carbon tetra chlorid) and aqueous solution of stannic chlorid be allowed to rest the aqueous solution of stannic chlorid will separate from the carbon tetra chlorid and can be drawn off in any suitable manner. The carbon tetra chlorid is now ready to be returned to the retort and used in a succeeding operation.

The aqueous solution of stannic chlorid can be made of any desired strength and purity. In this condition, it is free from such impurities as iron and lead chlorids, which are present in quantities in the material we propose to handle.

In our process the solvent, carbon tetra chlorid, can be reused with very little loss; the stannic chlorid is chemically pure and can be made of any desired strength.

Our process is also equally adapted for producing titanium chlorid, free from ferric chlorid and from mixtures of alloys of iron and titanium and other metals of the tin group. Again, by our process, we can obtain aqueous solutions of chlorids of tin, antimony, phosphorous, arsenic, etc., etc. free from the chlorids of such metals as lead, iron, etc. etc.

In our process, the solvent used, carbon tetra chlorid, has a very low boiling point, and the iron salts, lead salts and other salts which may be formed or present in the material operated upon, will not contaminate the stannic chlorid produced by this method, on account of their insolubility in the organic menstruum.

As an example of the equivalent of carbon-tetra-chlorid for use in our process, which fulfils the requirements hereinbefore specified of a solvent such as carbon-tetra-chlorid, we may mention the fact that we may use in place of carbon-tetra-chlorid, which is the most preferable compound, any other liquid chlorid of the methane series of hydro-carbons, such as ethyl chlorid. We may further mention as a solvent that is the equivalent of carbon-tetra-chlorid, any partially chlorinated methane hydro-carbon such as chloroform (CHCl₃) which is capable of being transformed to the fully chlorinated body of the same number of carbon atoms, e. g., if we use chloroform to start with when the tin scrap is chlorinated, the chloroform will be converted into carbon-tetra-chlorid, thus forming the fully chlorinated compound. We may further mention the use of any organic compound which by chlorination will yield carbon-tetra-chlorid, such for instance as carbon-disulfid,

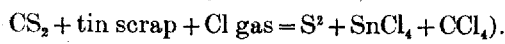

From the foregoing description, it is thought the complete process and manner of performing the same, as well as its many advantages over the prior art will be readily understood by those skilled in the art to which it appertains.

In this application we make no claim, *per se*, to the treating of the detinned residues with an anhydrous organic liquid to remove traces of stannic chlorid, as that forms the subject-matter of a divisional application.

What we claim, is:—

1. The method consisting in subjecting tin associated with a metal, the chlorid of which is not soluble in carbon tetrachlorid, to the action of chlorin and carbon tetrachlorid, separating the solution of stannic chlorid from the residue, and separating the stannic chlorid from its solvent.

2. The method consisting in subjecting tin, associated with a metal, the chlorid of which is not soluble in carbon tetrachlorid, to the action of chlorin and carbon tetrachlorid, separating the solution of stannic chlorid from the residue, and adding water in quantity sufficient to separate the stannic chlorid from said solvent.

3. The process of detinning, which consists in subjecting the tinned metal to the action of an anhydrous organic liquid solvent of the methane series which is insoluble in water and capable of dissolving stannic chlorid and contains dissolved anhydrous chlorin.

4. A process of detinning, consisting of subjecting the tinned metal to the action of chlorin gas dissolved in anhydrous organic liquid of the methane series capable of dissolving the anhydrous chlorids of metals of the tin group and capable of dissolving grease, fats, etc.

5. The process of detinning, which consists in subjecting the tinned metal to the action of anhydrous carbon tetra chlorid, containing dissolved chlorin.

6. The process of detinning, which consists in subjecting the tinned metal to the action of an anhydrous liquid solvent, which is insoluble in water and capable of dissolving stannic chlorid, and contains dissolved anhydrous chlorin, until the tin is changed to stannic chlorid, then withdrawing the solution of stannic chlorid in the anhydrous solvent, from the residue, and subjecting it to the action of water, substantially as specified.

7. A process of detinning, consisting in subjecting the tinned metal to the action of chlorin gas dissolved in an anhydrous organic liquid capable of dissolving the anhydrous chlorids of metals of the tin group, and capable of dissolving grease, fats, etc. then treating the solution of chlorids in the organic liquid with water to dissolve the chlorids of the tin group and then separating the aqueous solvent from the organic liquid, substantially as specified.

8. The process of detinning, which consists in subjecting the tinned metal to the action of an anhydrous liquid solvent, which is insoluble in water and capable of dissolving chlorid of tin, and contains dissolved anhydrous chlorin, until the tin is changed to a chlorid of tin, then withdrawing the solution of chlorid of tin in the anhydrous solvent, from the residue, and subjecting it to the action of water, to separate the tin chlorid from the anhydrous solvent.

9. The process of detinning, which consists in subjecting the tinned metal to the action of an anhydrous liquid solvent, which is insoluble in water and capable of dissolving stannic chlorid and containing dissolved anhydrous chlorin, until the tin is changed to stannic chlorid, then withdrawing the solution of stannic chlorid in the anhydrous solvent, from the residue, subjecting said solution to the action of water to dissolve the stannic chlorid and then drawing off the aqueous solution of the stannic chlorid from the anhydrous solvent.

10. A process of detinning consisting in subjecting the tinned metal to the action of chlorin gas dissolved in an anhydrous organic liquid capable of dissolving the anhydrous chlorid of metals of the tin group and capable of dissolving grease, fats, etc. then treating the solution of chlorid in the organic liquid with water, and then separating the aqueous solvent from the organic liquid, substantially as specified.

HARRY M. FERNBERGER.
WILLIAM W. MURRAY.

Witnesses to H. M. Fernberger's signature:
  COLIN A. McLEAN,
  I. C. DUNSTAN.

Witnesses to W. W. Murray's signature:
  HATTIE T. MURRAY,
  J. V. MONAGHAN.